United States Patent Office 3,468,992
Patented Sept. 23, 1969

3,468,992
PROCESS FOR PREPARING MANUFACTURED ARTICLES OF SILICON NITRIDE, ALSO IN ADMIXTURE WITH SILICON CARBIDE
Eugenio Lubatti, Torino, and Salvatore Pappalardo and Ugo Mirarchi, Novara, Italy, assignors to Montecatini Edison S.p.A., Milan, Italy, a corporation of Italy
No Drawing. Filed Apr. 20, 1966, Ser. No. 543,782
Claims priority, application Italy, Apr. 22, 1965, 8,805/65
Int. Cl. C04b *35/58, 33/32*
U.S. Cl. 264—63    4 Claims

ABSTRACT OF THE DISCLOSURE

Described is a process for preparing manufactured articles of silicon nitride. The process comprises admixing silicon nitride powder of at least 90% purity and a fineness of less than 0.075 mm. with less than 25% by weight of the mixture of a binder selected from the group consisting of boric acid, boron anhydride and boron phosphate. The mixture is cold compacted under a pressure between 0.5 and 5 t./cm.$^2$. The cold compacted material is subjected to sintering treatment in a nitrogenous atmosphere selected from the group consisting of nitrogen, ammonia and air at a temperature between 850 and 1250° C.

Our present invention relates to a method for preparing silicon nitride manufactured articles with high hardness and refractory characteristics.

The preparation of shaped articles of $Si_3N_4$ obtained by cold compacting (or by other shaping techniques) of powdered silicon nitride followed by sintering, is known not to permit obtaining manufactured articles having good compactness and hardness. In order to obviate these inconveniences, recourse is had to a system of preparing the pieces by compacting silicon powder either with or without various additions. The pieces are then subjected to heating under a nitrogen stream to transform silicon into silicon nitride. According to other proposals, siilcon powder is added to other refractory materials, e.g. SiC, BN, $Al_2O_3$, $ZrO_2$, etc., shaped into pieces by compacting the powder mixture and sintered under a nitrogen atmosphere at high temperature. In this case also, the binding characteristic of silicon nitride formed in situ is utilized. These techniques are based essentially on the use of silicon powder in the pre-formed piece and on the transformation of silicon into silicon nitride by sintering under nitrogen. The duration of the sintering operation depends on the size of the piece and on the presence or absence of suitable catalysts.

The present invention has as an object the preparation of manufactured silicon nitride articles which may contain SiC in admixture, in the presence of a suitable binder whose nature can vary depending on the conditions of use of the piece. The silicon carbide present is preferably about 50%.

Boric acid, boric anhydride or boron salts, added in amounts lower than 25% by weight, and preferably from 2 to 5% by weight in respect of the resulting composition, is used as a binder. After cold compacting, under pressures comprised between 0.5 and 5 t./cm.$^2$, and shaping, the pieces are subjected to a heat treatment at a temperature below 1500° C., and preferably between 850 and 1250° C. This heat treatment is carried out in either a nitrogen or ammonia atmosphere or in an air atmosphere.

The following examples illustrate some embodiments of preparation of manufactured articles according to our invention, without limiting the scope thereof.

EXAMPLE 1

Silicon nitride having a purity of at least 90% is ground in a ball mill to obtain a fineness lower than 0.075 mm. The powder is then wet with an aqueous boric acid solution having a concentration such that, after the pretreatment at 300° C., the powder contains about 5% of $B_2O_3$. In this manner, $B_2O_3$ is uniformly distributed in the whole mixture. The powder is then pressed under a pressure of a 4 t./cm.$^2$. The green piece is sintered in air at a temperature comprised between 850 and 1250° C., preferably at about 1000° C. The thermal treatment gives a manufactured article of such high hardness as to make machining it very difficult.

EXAMPLE 2

4 parts by weight of boron phosphate are added to 100 parts of silicon nitride having a purity above 90%, ground to a fineness lower than 0.075 mm.

Alternatively, silicon nitride having the same characteristics of that of Example 1, may be wet with a boric acid solution and then with one of phosphoric acid so that boron phosphate is formed in situ. This boron phosphate is uniformly distributed in the whole mixture which is thereafter preheated at 300° C. In this case, the molar ratio between boric acid and phosphoric acid should be about unity to form boron phosphate. The amount of the boron phosphate formed in situ must be lower than 25% by weight in respect of the resulting composition.

The mixture is homogenized and subjected to a pressure of 5 t./cm.$^2$ in the cold. The green piece is then sintered under a nitrogen atmosphere at a temperature of about 1050° C. In this case also, the thermal treatment gives the piece very good refractory and mechanical strength characteristics.

EXAMPLE 3

A mixture of the same parts of silicon carbide and silicon nitride is ground in a ball mill to obtain a fineness of the order of 0.060 mm. The powder is then wet with an aqueous boric acid solution having a concentration such that, after a thermal treatment at 300° C., the powder contains 4% of $B_2O_3$. The powder is pressed under a pressure of 3 t./cm.$^2$ and the green piece is sintered in air at 1000° C. The product obtained has such a high hardness as to render its machining very difficult.

If pieces of a complex shape are to be made, it is necessary to carry out a pre-sinterization at 600–800° C., to machine the pre-sintered piece and then subject the machined piece to the final thermal treatment as described above.

During the sintering stage, the size of the piece does not undergo variations higher than 1–2%, making possible obtaining pieces with very narrow tolerance limits. The surface of the sintered pieces are smooth and their structure is compact and uniform.

We claim:
1. A process for preparing manufactured articles of silicon nitride, which comprises admixing silicon nitride powder of at least 90% purity and a fineness of less than

0.075 mm. with less than 25% by weight of the mixture of a binder selected from the group consisting of boric acid, boron anhydride and boron phosphate, cold compacting the mixture under a pressure between 0.5 and 5 t./cm.$^2$, subjecting the cold compacted material to sintering treatment in a nitrogenous atmosphere selected from the group consisting of nitrogen, ammonia and air at a temperature between 850 and 1250° C.

2. The process of claim 1, wherein the sintering temperature is 1000° C.

3. The process of claim 1, wherein the silicon nitride contains silicon carbide.

4. The process of claim 3, wherein about equal amounts of silicon nitride and silicon carbide are present.

References Cited

UNITED STATES PATENTS

| | | | |
|---|---|---|---|
| 2,618,565 | 11/1952 | Nicholson | 106—44 |
| 2,750,268 | 6/1956 | Erasmus et al. | 106—44 |
| 3,035,325 | 5/1962 | Nicholson et al. | 106—44 |
| 3,222,438 | 12/1965 | Parr et al. | 264—66 |

DONALD J. ARNOLD, Primary Examiner

U.S. Cl. X.R.

106—39, 44; 264—65